US008029636B2

(12) United States Patent
Wycech

(10) Patent No.: US 8,029,636 B2
(45) Date of Patent: Oct. 4, 2011

(54) METHOD OF MASKING A SURFACE

(76) Inventor: Joseph Wycech, Roseville, MI (US)

( * ) Notice: Subject to any disclaimer, the term of this patent is extended or adjusted under 35 U.S.C. 154(b) by 125 days.

(21) Appl. No.: 12/187,625

(22) Filed: Aug. 7, 2008

(65) Prior Publication Data

US 2009/0044902 A1 Feb. 19, 2009

Related U.S. Application Data

(60) Provisional application No. 60/956,274, filed on Aug. 16, 2007.

(51) Int. Cl.
*B32B 37/12* (2006.01)

(52) U.S. Cl. ..... 156/247; 156/293; 156/305; 156/308.8; 118/504; 118/505

(58) Field of Classification Search ................... 156/247
See application file for complete search history.

(56) References Cited

U.S. PATENT DOCUMENTS

| | | | | | |
|---|---|---|---|---|---|
| 4,061,825 | A * | 12/1977 | Counsell et al. | ........ | 428/355 CP |
| 4,835,026 | A * | 5/1989 | Horiki et al. | ................ | 428/40.6 |
| 5,035,930 | A * | 7/1991 | Lacourse et al. | ............. | 428/35.6 |
| 5,043,196 | A | 8/1991 | Lacourse et al. | | |
| 5,186,978 | A | 2/1993 | Woodhall et al. | | |
| 5,302,413 | A | 4/1994 | Woodhall et al. | | |
| 5,362,786 | A | 11/1994 | Woodhall et al. | | |
| 5,411,760 | A | 5/1995 | Woodhall et al. | | |
| 5,415,923 | A * | 5/1995 | Sarokin et al. | .................. | 442/68 |
| 5,523,117 | A | 6/1996 | Woodhall et al. | | |
| 5,730,824 | A * | 3/1998 | Spence et al. | ............ | 156/244.19 |
| 5,876,791 | A * | 3/1999 | Woodhall et al. | ............. | 427/156 |
| 6,117,485 | A | 9/2000 | Woodhall et al. | | |
| 6,444,761 | B1 | 9/2002 | Wang et al. | | |
| 2002/0114890 | A1* | 8/2002 | Posey et al. | ................ | 427/385.5 |
| 2004/0108615 | A1* | 6/2004 | Foley | ........................... | 264/46.4 |
| 2005/0175797 | A1* | 8/2005 | Ogawa et al. | .................. | 428/33 |

* cited by examiner

*Primary Examiner* — Philip Tucker
*Assistant Examiner* — Vicki Wu
(74) *Attorney, Agent, or Firm* — Dickinson Wright PLLC

(57) ABSTRACT

A method of applying a flexible, biodegradable sheet of starch-based material to mask a surface to be coated is described. The sheet is a solid, flexible, expanded, close-celled foam. The sheet is dispersible in water.

24 Claims, 2 Drawing Sheets

METHOD OF MASKING A SURFACE

CROSS REFERENCE TO RELATED APPLICATION

The present application claims priority from U.S. Provisional Application Ser. No. 60/956,274, filed Aug. 16, 2007, entitled "Method Of Masking A Surface."

BACKGROUND OF THE INVENTION

1. Field of the Invention

The present invention relates to the field of protective coatings to be used during coating operations of various surfaces, such as surfaces of automotive parts of motor vehicles.

2. Description of the Prior Art

It is well known that painting or coating operations often require masking of certain portions of the object to be painted to prevent overspray. For example, it is often necessary to mask parts on a vehicle (e.g., a motor vehicle) from paint overspray. On occasion, it is necessary to mask painted portions of a vehicle from paints of a different color.

Currently, paper or plastic film is often used as a mask. Two sided tape is often applied to the edges of the cut mask to adhere the mask to the primed surface. Once the top coat of paint is applied, the paint is either air dried or oven dried. The mask is then thrown away and disposed of as land fill. For specific masking applications, inexpensive foam ("Styrofoam") blocks are also often used as masks and then discarded after painting and drying by room air temp or oven conditions. Furthermore, even when done carefully, defects in such masks may allow paint to contact surfaces that are desired to be protected.

Spray-on chemical masking solutions have been proposed to purportedly solve the problem of protecting surfaces during coating processing operations. However, such techniques have often not found extensive use. Some of the proposed liquid chemical masks have been unsuitable for application to portions of a vehicle because of damage which would potentially occur to the protected portions of the vehicle. In addition, masks that require solvents for removal are problematic in view of the increasing regulation of disposal of solvents as environmental regulation becomes stricter with time. Other such compositions are difficult to apply, difficult to remove, excessively costly, or the like.

From the above it is seen that an improved masking material that is easily applied and removed, that provides good surface protection, that is economical, and whose use entails little or no environmental impact is needed. In addition, it is known that coating overspray, such as paints, can be collected, processed and reused as filler or the like. A masking material that would facilitate this process would be highly desirable.

Woodhall et al. has disclosed various masking materials based on dextrin. See U.S. Pat. Nos. 5,876,791, 5,362,786; 5,411,760; 5,523,117; 5,302,413 and 5,186,978. In addition, in U.S. Pat. No. 6,117,485 to Woodhall et al. discloses fluid masking materials based on dextrin or cellulose derivatives. The disclosure of all of these patents to Woodhall et al. are all incorporated herein by reference.

SUMMARY OF THE INVENTION

In one aspect, the present invention provides a method of masking an automotive or other part prior to coating the part. A thin sheet of flexible, but solid, starch-based, biodegradable material is preferably wetted (or the surface to which it is to adhere is wetted) to produce a tackified, adhesive surface. The tackified sheet is then applied to the surface of the part on which no coating is desired. The part with the mask is then coated, for example by painting in a paint spray booth. The mask is then removed either before or after the coating is baked. In one aspect, coating which has accumulated on the mask may be collected for reuse.

In another aspect, the biodegradable sheet is first formed into a three-dimensional cover or block to overlay a structure on which no coating is desired.

These and other aspects of the invention will be fully illustrated herein with reference to the drawings.

DETAILED DESCRIPTION OF THE INVENTION

Figure 1:
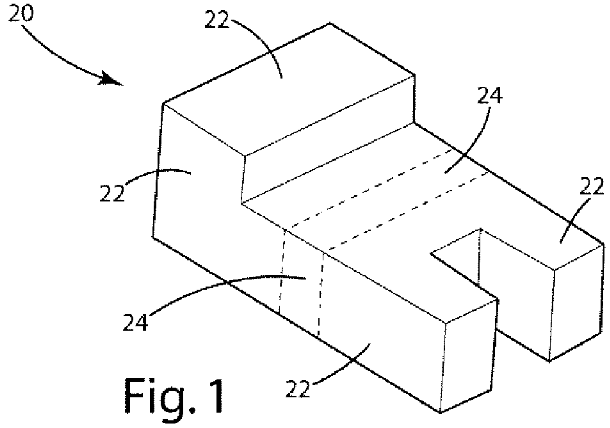
FIG. 1 is a perspective view of a part to be coated or painted with the portion to be masked outlined with dotted lines.
Figure 2:
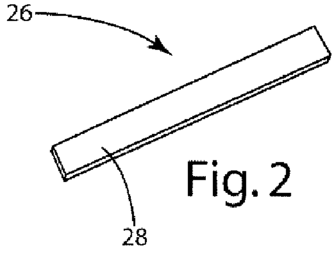
FIG. 2 is a perspective view of a die-cut, starch-based, biodegradable sheet for use as a mask in the present invention.

Referring now to FIG. 1 of the drawings, part 20 is shown having area or region 22 to receive a coating and surface or region 24 which is not to be coated. FIG. 2 illustrates a preferred, starch-based, solid, foamed, closed-cell biodegradable mask or sheet 26 which is used to mask area 24.

Mask 26 may be formed by the extrusion of a high amylase starch, i.e., starch preferably having at least about 45% and preferably at least 65% by weight amylase content, at a total moisture or water content of preferably about 21% or less by weight, formed at a temperature of preferably from about 150 degree to 250 degree C. Material useful for sheet 26 in this invention may be any of several starches, native or converted. Such starches include those derived from any plant source including corn, potato, wheat, rice, sago, tapioca, waxy maize, sorghum and high amylase corn, etc. Starch flours may also be used as a starch source. Also included are the conversion products derived from any of the former bases including, for example, dextrins prepared by hydrolytic action of acid and/or heat; oxidized starches prepared by treatment with oxidants; fluidity or thin boiling starches prepared by enzyme conversion or mild acid hydrolysis; and derivatized and cross-linked starches. Also included are unmodified or modified starches. Modified starches are those derivatized or modified by typical processes known in the art, e.g. esterification, etherification, oxidation, acid hydrolysis, cross-linking and enzyme conversion. Also, preferred for use herein as sheet 26, is a high amylase starch product, and more preferred, an expanded or foamed high amylase starch product. One of the preferred materials for sheet 26 is disclosed in U.S. Pat. No. 5,035,930, "Biodegradable Shaped Products and the Method of Preparation Thereof," by Lacourse, et al., the complete disclosure of which is incorporated herein by reference. Accordingly, a biodegradable, low density, low cost sheet 26 may be obtained by expanding a high amylase starch material through an extruder preferably in the presence of a total moisture content of about 21% or less by weight, at a temperature of preferably from about 150 degrees to 250 degree C. The expanded product can be used in the from it is in after extrusion, e.g., a sheet. It is to be understood, however, that the present invention is not limited to a foamed sheet 26. Sheet 26 may not be foamed in some applications. Alternatively, glass or plastic microspheres may be included in sheet 26 without foaming to reduce density.

As stated, one preferred starting starch material preferred in this invention is a high amylase starch, i.e., one containing about 45% by weight of amylase. It is well known that starch is composed of two fractions, the molecular arrangement of one being linear and the other being branched. The linear fraction of starch is known as amylase and the branched fraction amylopectin. Starches from different sources, e.g., potato, corn, tapioca, and rice, etc., are characterized by different relative proportions of the amylase and amylopectin components. Some plant species have been genetically developed which are characterized by a large preponderance of one fraction over the other.

Fabrication of a sheet of material of the type used in the present invention may be formed by an extruder. The extruder may be of conventional manufacture and of the type generally utilized for extruding biodegradable products.

Extrusion is a conventional, well-known technique used in many applications for processing plastics and has been used to a lesser of limited extent in processing food starches. As set forth in U.S. Pat. No. 5,043,196, the entire disclosure of which is incorporated herein by reference, control of the temperature along the length of the extruder may be controlled in zones along the length of the screw. Heat exchange means, typically a passage, such as a channel, chamber or bore located in the barrel wall, for circulating a heated media such as oil, or an electrical heater such as a coil type heater, is often used. Additionally, heat exchange means may also be placed in or along the shaft of the screw device.

Variations in any of the elements used in the extruder may be made as desired in accordance with conventional design practices in the field. A further description of extrusion and typical design variations can be found in "Encyclopedia of the Polymer Science and Engineering," Vol. 6. 1986, pp. 571 to 631.

Sheet 26 may also be made in accordance with the teachings of U.S. Pat. No. 5,730,824, the entire disclosure of which is incorporated herein by reference. The most desirable material for sheet 26 is available from KTM Industries of Lansing, Mich., which is sold under the trade name "Green Cell" foam sheet. "Green Cell" is typically greater than 90% (by weight) corn starch. "Green Cell" foam is a strong, resilient, typically medium density, closed-cell foam. "Green Cell" is an expanded material which is considered biodegradable under ASTM 6400. It can be cut using traditional cutting devices such as foam saws, contour saws, steel rule die cutters and even shears or scissors. Thus, sheet 26 is a flexible solid, prior to application at region 24.

Figure 3:
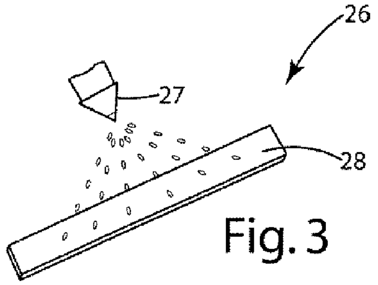
FIG. 3 illustrates the application of water to a starch-based, biodegradable sheet to tackify the principal surface.

Referring now to FIG. 3 of the drawings, principal surface 28 of sheet 26 is wetted, preferably with ordinary water. The amount of water 27 used is that amount required to tackify surface 28 sufficient so that it will adhere to region 24 of part 20. Water 27 may be applied by hand by simply rubbing it on principal surface 28 until the requisite amount of tack is achieved. Alternatively, it may be desirable to apply water 27 using a brush, roller spray nozzle or through an automated process. It is also acceptable and at times preferable to wet region 24 rather than sheet 26.

Figure 4:
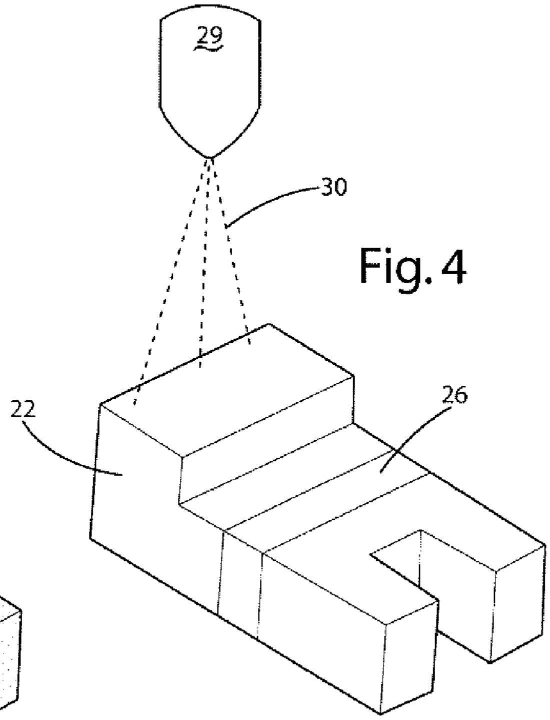
FIG. 4 is a perspective view of the part of FIG. 1 with the starch-based, biodegradable sheet adhered thereto and a spray coating being applied.

In FIG. 4, sheet 26 is shown applied to part 20 at region 24. It is to be understood that tackified surface 28 adheres to part 20. The tackified surface 28 dries in a few minutes on part 20. Although sheet 26 will adhere to most surfaces with simply the addition of water to principal surface 28, it may be desirable in some instances to use a diluted adhesive in lieu of water. Surface 24 should be clear of any contaminants such as dust or dirt and is preferably primed. Use of an adhesive helps avoid any shrinkage of mask 26. Most water soluble adhesives are acceptable for this purpose. Most preferably, a number of biodegradable adhesives will be recognized by those skilled in the art, including certain polyesters, proteins, polysaccharides, polyphenols, lipids, shellac, natural rubber and the like. Certain water-soluble, biodegradable adhesives are available under the "Aquabond" name from "Aquabond Technologies" of Camarilla, Calif. A preferred adhesive which is both water-soluble and biodegradable can be obtained from Nyatex Adhesive and Chemical Company of Howell, Mich. as "Nyatex Laminating Adhesive No. 20L0892HSR," which is a low viscosity, water based resin at about 1000 centipoise and contains some liquid rubber.

Other adhesives which may be suitable include those disclosed in U.S. Pat. No. 6,444,761. "Water Soluble Adhesive Compositions," the entire disclosure of which is incorporated herein by reference. Also, while sheet 26 will adhere to bare metal, in many applications, region 24 will be primed with a primer coating prior to application of sheet 26. As stated, either principal surface 28 of sheet 26 will be wetted with water or adhesive, or water or adhesive can be applied to region 24 of part 20.

Figure 6:
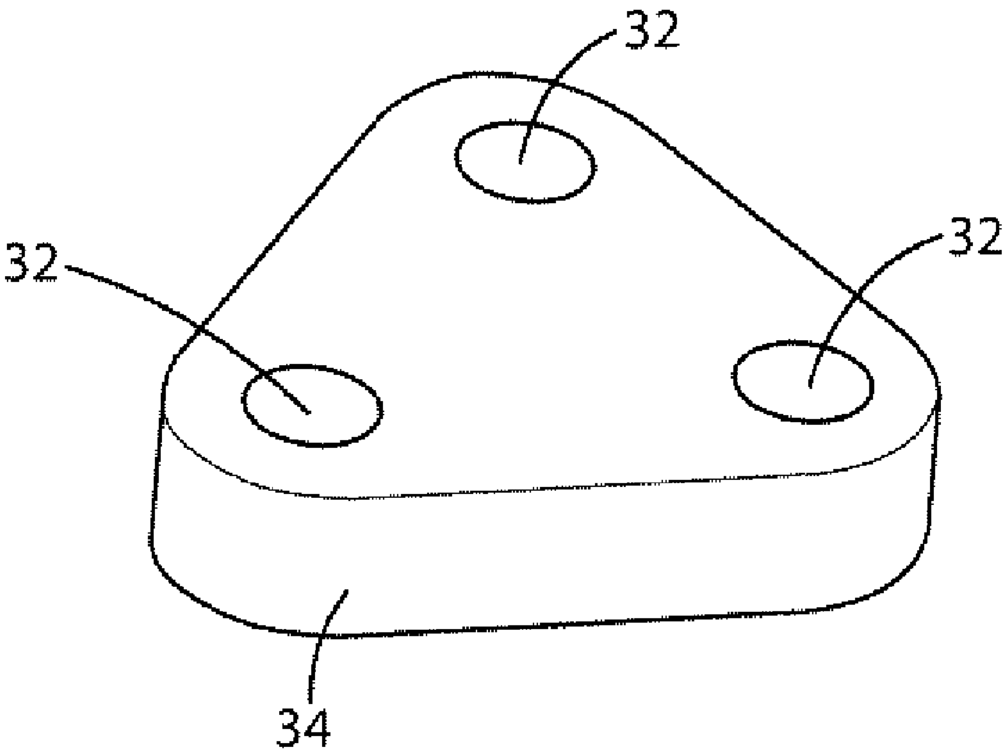
FIG. 6 is a perspective view of a three dimensional (block) starch-based, biodegradable mask with cut-outs corresponding to a portion of a part to be masked.

The thickness of sheet 26 can vary widely, but it has been found that a thickness of about 0.010 to about 0.125 inches is suitable for many applications. As will be explained more fully, in one preferred embodiment of the present invention, thicker blocks of "Green Cell" can be used as shown in FIG. 6 with cut-outs 32 in block 34 for receiving a projection of a part to be masked.

Although not shown for simplicity in the drawings, it may be desirable in some instances to oversize sheet 26 such that wings or tabs of sheet 26 can be adhered together. This mask-to-mask contact may also be suitable where a part has a hole or orifice at the region where mask 26 is applied. In other words, if, for example, a flat piece of metal (or other material) has an opening at the region to be masked, sheet 26 may be sized such that the wetted surfaces touch (and adhere) to one another through the opening. One of the many advantages of the present invention is that (as known) metal expands when heated. Sheet 26 will generally exhibit enough "flex" to compensate for this expansion.

Another advantage of the present invention is the ability of sheet 26 to withstand temperatures higher than most prior art plastic film masks. In some instances, sheet 26 can withstand temperatures of 400° F. without thermally decomposing.

Again referring to FIG. 4, coating 30 is, in this instance, sprayed onto part 20 by spray nozzle 29. Coating 30 covers both region 22 and sheet 26. Sheet 26 should be free of pinholes so that no coating 30 penetrates to region 24.

Figure 5:
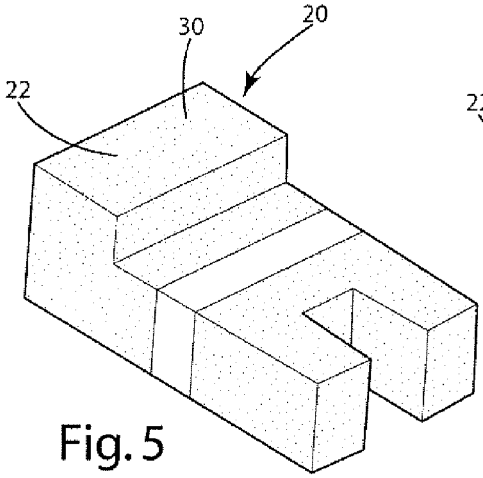
FIG. 5 is a perspective view of the part of FIG. 4 after removal of the starch-based, biodegradable sheet.

Referring to FIG. 5, part 20 is shown after removal of sheet 26. Sheet 26 can be removed in any manner by simply peeling it off of region 24. Due to the nature of sheet 26, one removal method is by spraying sheet 26 with water. Sheet 26 is substantially water dispersible, meaning that it can be dispersed or disintegrated in water. As will be appreciated by those skilled in the art, the term biodegradable means that sheet 26 is substantially reduced to non-toxic compounds in the environment.

Where it is desired to collect and recycle coating 30 which has deposited on sheet 26, sheet 26 can be placed in a vat or other container filled with water. Sheet 26 will then disperse, leaving coating 30 to be collected, processed and reused. Region 22 is coated with coating 30 and region 24 is entirely free of coating 30.

Referring now to FIG. 6 of the drawings, block 34 is shown having cut-outs or holes 32 shaped to receive projections of a part (not shown) which are to be masked during a coating operation. Block 34 is most preferably formed of the aforementioned "Green Cell" material, i.e. a starch-based, biodegradable, expanded foam. Block 34 can be formed in a number of ways, including by simply stacking wetted sheets of "Green Cell," allowing them to dry and forming holes 32 therein. Other bulk molding processes may also be suitable. Water or adhesive (as described above) is used to wet holes 32 to adhere to the part projections. One of the advantages of block 34 is that being a foamed material, it can also absorb impacts. For example, it may be possible to adhere block 34 to a part and then use block 34 to absorb impacts during shipping to a coating facility.

One preferred application of the present invention is in the after market collision repair industry. After sheet 26 is applied to the surface to be masked, it can be trimmed to shape with a utility knife or the like. The operator can simply wipe the surface to be masked with a wet rag and apply sheet 26 to the wetted surface. Typically, in all applications of the present invention, only a few seconds to a few minutes is required for sufficient adherence before the coating application. Thus, it is to be understood that sheet 26 can be wetted (or the part wetted) and be hand molded over a three dimensional part. This provides a significant and simple masking operation for collision shops.

What is claimed is:

1. A method of masking a portion of an article to be coated, comprising:

providing, a solid, flexible, biodegradable, starch-based sheet;

wetting a surface of the solid sheet to produce an adhesive surface and adhering the adhesive surface to the portion of the article to be masked or wetting the portion of the article to be masked and engaging the solid sheet to the wetted portion to produce an adhesive surface for adhering the solid sheet to the article to be masked;

coating the article with the sheet attached thereto; and removing the sheet.

2. The invention recited in claim 1, wherein said wetting step includes the application of water.

3. The invention recited in claim 1, wherein said wetting step includes the application of an adhesive.

4. The invention recited in claim 1, wherein the sheet is formed of a corn-starch-based material.

5. The invention recited in claim 1, wherein the sheet is an expanded closed-cell foam.

6. The invention recited in claim 1, wherein said coating step is followed by a baking step to cure or dry the coating.

7. The invention recited in claim 1, wherein said coating step deposits coating material on the sheet and the coating material is reclaimed.

8. The invention recited in claim 1, wherein said removing step is performed using water.

9. The invention recited in claim 1, wherein the coating is paint.

10. A method of masking a surface of an article to he coated, comprising:

providing a biodegradable, solid block of a starched-based material and having at least one cavity for receiving a portion of the article to be masked;

wetting a surface of the solid block to produce an adhesive surface and adhering the solid block to the portion of the article to be masked or wetting the portion of the article to be masked and engaging the solid block to the wetted portion of the article to produce an adhesive surface for adhering the solid block to the portion of the article to be masked;

coating the article with the block attached thereto; and removing the block.

11. The method recited in claim 10, wherein said wetting step is performed with water.

12. The invention recited in claim 10, wherein said coating step is followed by a baking step to cure or dry the coating.

13. The invention recited in claim 10, wherein the block is an expanded, closed-cell foam.

14. The invention recited in claim 10, wherein the at least one cavity is formed by removing material from the block.

15. The invention recited in claim 10, wherein coating is paint.

16. The invention recited in claim 10, wherein the block is removed with water.

17. The invention recited in claim 10, wherein the coating is deposited on the block and the coating is reclaimed.

18. The invention as claimed in claim 10, wherein the block serves as a mask and as an impact absorber.

19. A method of masking a portion of an article to be painted, comprising:

providing a sheet of flexible, solid, expanded, closed-cell foamed, starch-based biodegradable material;

cutting the sheet to a size closely matching that of the portion of the article to be masked;

wetting one surface of the cut sheet to produce an adhesive surface and adhering the adhesive surface to the portion of the article to be masked or wetting the portion of the article to be masked and engaging the cut sheet to the wetted portion to produce an adhesive surface for adhering the solid sheet to the article to be masked;

adhering the sheet to the portion of the article to be masked;

coating the article and the cut sheet with paint;

baking the coated article with the cut sheet attached thereto; and removing the cut sheet with the use of water.

20. The invention recited in claim 19, wherein said wetting step includes the application of water or adhesive.

21. The invention recited in claim 1, wherein said coating step is followed by an air drying step to dry the coating.

22. The invention recited in claim 10, wherein said coating step is followed by an air drying step to dry the coating.

23. The invention recited in claim 3, wherein the adhesive is water-soluble and biodegradable.

24. The invention recited in claim 20, wherein said wetting step uses an adhesive and the adhesive is a water-soluble, biodegradable adhesive.

* * * * *

UNITED STATES PATENT AND TRADEMARK OFFICE

CERTIFICATE OF CORRECTION

PATENT NO. : 8,029,636 B2
APPLICATION NO. : 12/187625
DATED : October 4, 2011
INVENTOR(S) : Joseph Wycech It is certified that error appears in the above-identified patent and that said Letters Patent is hereby corrected as shown below:

Column 6, Line 1 Claim 10: “he” should read -- be --.

Signed and Sealed this
Seventeenth Day of January, 2012

David J. Kappos
*Director of the United States Patent and Trademark Office*